Patented Apr. 8, 1947

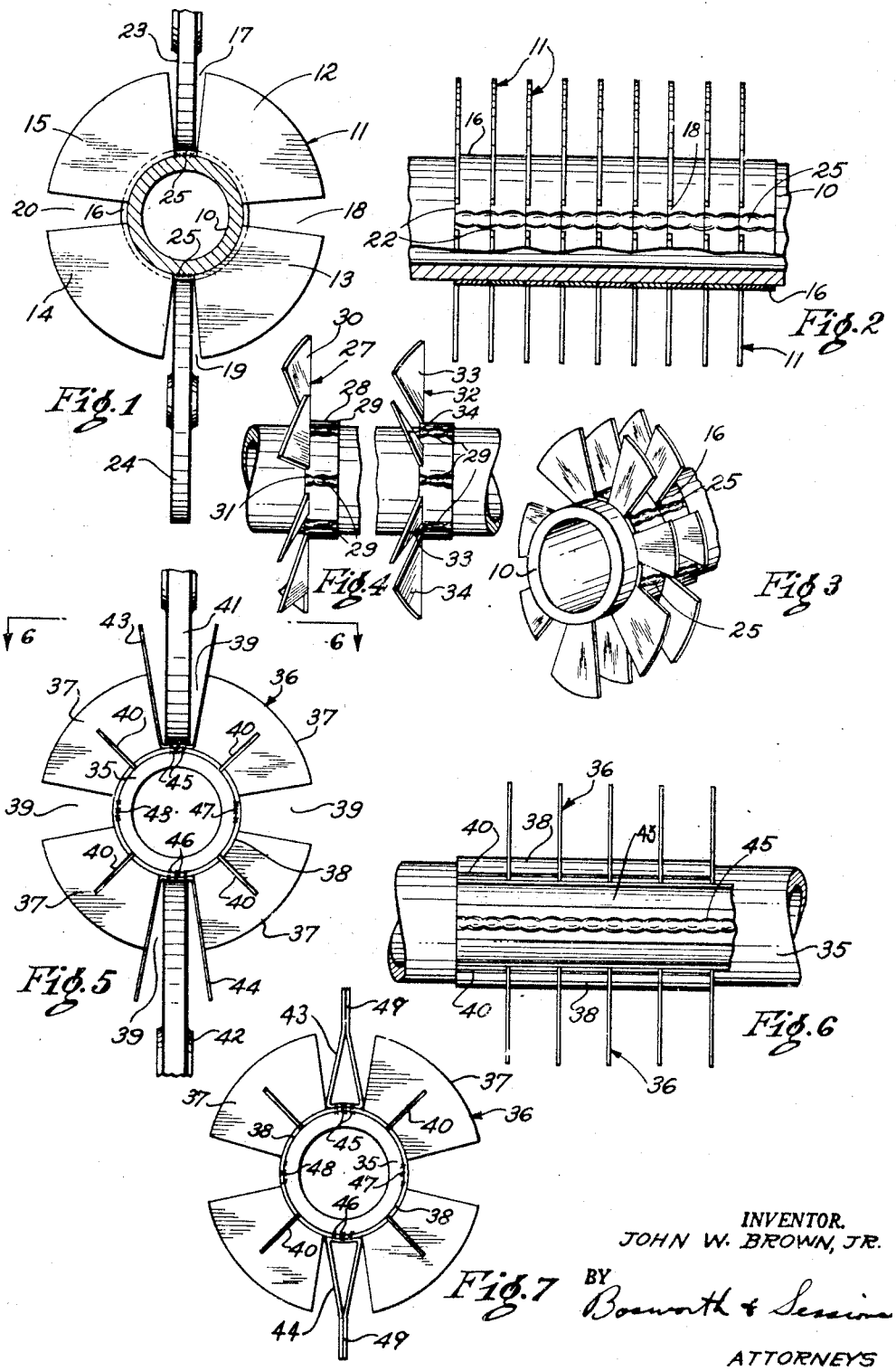

2,418,619

UNITED STATES PATENT OFFICE 2,418,619

FINNED TUBE

John W. Brown, Jr., Lakewood, Ohio, assignor to Brown Fintube Company, Elyria, Ohio, a corporation of Ohio Application August 11, 1943, Serial No. 498,199

5 Claims. (Cl. 257—262)

This invention relates to heat exchange elements and more particularly to finned tubes and methods of making same.

A general object of the invention is the provision of a heat exchange element provided with a plurality of separately formed fin members extending generally transversely of the element and welded thereto, the arrangement being such that the welding operation can be carried out rapidly and economically to provide adequate paths for the flow of heat between the fin members and the tube. Another object is to provide an efficient and economical method of making such heat exchange elements. More specifically an object of the invention is to provide a finned tube having circumferentially extending fin members secured thereto, the fin members being constructed and arranged so that they can be welded to the tube rapidly and economically to provide adequate paths for the flow of heat between the fin members and the tube. Another object is to provide a method of making such finned tubes. A further object is to provide heat exchange elements, and more specifically, finned tubes, wherein the heat exchange surface is augmented by fin members extending both transversely and longitudinally of the elements or tubes. A further object is to provide a tube of this type which has much greater strength to resist lateral deflection than a base tube of the same size, gage and material. Another object is to provide efficient and economical methods of making such elements or tubes. Further objects and various advantages of my invention will become apparent from the following description of preferred forms thereof, reference being made to the accompanying drawings. The essential characteristics are summarized in the claims.

My invention is useful in conjunction with tubular or other surfaces, wherein it is desired to augment the effective heat transfer area. The invention is described herein as applied to finned tubes, and a preferred form of the invention may comprise a tube in which effective heat transfer area is augmented by a plurality of fin members secured to the exterior of the tube and extending in generally transverse or circumferential directions. Each fin member comprises a base portion adapted closely to engage the tube, and a plurality of finned portions extending outwardly from the base portions. The fin portions are spaced apart while the base portions preferably bridge the spaces between the fin portions. The various fin members are arranged on the tube so that the spaces are aligned to provide, along the exterior of the tube, unobstructed, longitudinally extending paths such that a resistance welding electrode, such as a roller electrode, can be moved along the paths, making contact successively with the base portions of a series of fins, and thus welding the transverse fins to the tube by welding operations in which the relative movement between electrode and tube is longitudinal of the tube, i. e., transverse to the fins. By this arrangement a series of finned members can be welded to the surface of the tube by operations which can be carried out continuously for the length of the finned portion of the tube and at high speed. In the case of tubes, at least a pair, and preferably two or more pairs, of diametrically opposite paths are provided, and the welding operation is carried out by oppositely disposed electrodes engaging the base portions of the series of fin members and arranged simultaneously to weld oppositely disposed areas of the bases of the fin members to the tube.

According to another form of my invention, longitudinally extending channel section fin members may be disposed in the paths formed by the spaces or slots and welded to the base portions of the transverse fin members by the same operation that is employed to weld the base portions to the tube. These channel section members may be left in channel section form may have their flanges bent inwardly and preferably welded together as described in my co-pending application, Serial No. 386,503, filed April 2, 1941, now Patent No. 2,355,621, issued August 15, 1944. The various welding operations may be carried out by an apparatus generally similar to that disclosed in my Patent No. 2,298,249, issued October 6, 1942.

Referring to the drawings which illustrate finned tubes made according to preferred forms of my invention, Figure 1 is an end view of a finned tube embodying my invention and showing the welding electrodes in position for carrying out the welding operations; Figure 2 is a longitudinal view partially in section of the tube shown in Figure 1; Figure 3 is a perspective view illustrating a portion of the tube of Figures 1 and 2; Figure 4 illustrates modified forms of fin members which may be employed in tubes made according to my invention; Figure 5 is an end view showing a modified form of tube and diagrammatically illustrating the welding operation; Figure 6 is an elevation of the tube shown in Figure 5 as indicated by the line 6—6 of Figure 5; and Figure 7 is an end elevation of a tube such as that shown in Figures 5 and 6 and in which the longitudinally extending channel section members have been closed to provide a somewhat streamlined shape.

Referring particularly to Figures 1, 2 and 3, a finned tube made according to a preferred form of my invention may comprise a tube 10 having a plurality of fin members indicated generally at 11 secured thereto. The fin members are preferably comparatively light gauge metal stampings, each having a plurality of fin portions indicated at 12, 13, 14 and 15 and generally cylindrical hub or base portions 16 adapted closely to engage the outer surface of the tube.

In order to make it possible for the fin members to be rapidly and economically welded to the tube, the several fin portions of each fin member are spaced apart as indicated at 17, 18, 19 and 20, the spaces extending inwardly to the hub or base portions. Thus when a plurality of fin members are assembled on a tube with the spaces aligned, substantially unobstructed longitudinally extending paths are provided through the aligned spaces and along the outer surfaces of the base or hub portion 16. Preferably the paths are straight and parallel to the axis of the tube. However, for some purposes it may be desirable to provide paths which are somewhat curved, for example, steep spiral paths extending along and around the tube. The alignment of the spaces needs only to be sufficient to permit unobstructed movement of the electrodes along the paths.

It will be noted that the several fin members preferably are assembled in such manner that the hub portions are in contact with each other, and the fin members preferably are constructed so that the ends of the hub portions between the fin portions are substantially flush with the fin portions at their juncture with the base portions as shown at 22 in Figure 2. Thus when the fin members are assembled on the tube there are no substantial gaps between the base portions of adjacent fin members, thereby providing a substantially smooth surface along the assembled base portions through the longitudinally extending paths.

With an arrangement of this sort, the fin members can be resistance welded rapidly and economically to the supporting tube structure by current supplied through a pair of oppositely disposed electrodes, preferably rollers as indicated at 23 and 24 in Figure 1. By applying suitable welding pressure and causing a suitable welding current to flow between the electrodes while moving the tube and fin assembly longitudinally with respect to the electrodes, diametrically opposite areas of the bases of the whole series of fin members can be welded to the tube by a single continuous operation. After one series of oppositely disposed welds has been made, the tube may be indexed so that the electrodes will pass along another pair of paths, such as the paths provided by the spaces 18 and 20, and the welding operation repeated to provide two more rows or series of welded areas 25. In the drawing I have illustrated only two pairs of paths and two pairs of series of welds. Those skilled in the art will appreciate that additional pairs of paths and welds may be provided if desired.

The welding operation is preferably carried out generally according to the disclosures of my prior patent and application aforesaid, the welding current being controlled by means of an electronic control to provide a series of substantially evenly spaced welded areas. The welding operation is preferably carried out at a sufficiently high speed so that the metal of the tube does not become excessively heated and is not unduly softened. Thus the tube is enabled to withstand the welding pressures without requiring the use of any internal mandrel. As an example of a procedure which gives satisfactory results, I refer to the following:

Fin members stamped from low-carbon steel, 0.035 inch in thickness, having base portions about 1 inch in internal diameter and about ¼ inch in axial length (giving 4 fin members per inch of tube length) and with four radially extending fin portions spaced about ¼ inch apart circumferentially at the juncture of the fin portions with the base or hub were welded on a 1 inch O. D., 12 gage low-carbon steel tube, using a 150 k. v. a. welding machine with Thyratron control of the welding current. Diametrically opposite welding rolls with a width of $\%_4$ inch engaged the bases of the fin members in opposite paths and current applied simultaneously to produce two diametrically opposite rows of evenly spaced welded areas extending substantially throughout the length of the assembled fin bases, the welding current flowing through the tube walls between the welds, no internal mandrel or electrode being employed. The welding pressure exerted by the electrodes was about 800 to 1000 pounds, the speed of movement of the tube and fins relative to the welding axis was about 10 feet per minute. The 60 cycle alternating current was controlled by the electronic control to give a timing of 2 cycles on and 4 cycles off, giving about five slightly overlapping oval-shaped welded spots per inch of tube, thus producing welded areas having scalloped edges as shown in the drawing. The current was about 40% of rated capacity of the machine at 6 to 8 volts. This gives an effective heating current equivalent to about 9600 amperes flowing for 2 cycles.

By varying the number of slots or paths in the fins and by varying the length of the hub or base portions, the area of the welds between the tube and the base portions can be varied so as to give ample heat transfer capacity for the surface for which the tube is designed. The limiting factor in the transfer of heat from the hub or base to the several fin portions is the cross-sectional area of the fin portions at their connection with the base portions. By proper spacing and proportioning, the welded areas can be made of such size that they will give paths for the transfer of heat from the tube into the base and to the junctures of the fins with the base at least substantially equal to the total cross-sectional area of the fins at their junctures with the respective base portions. Thus in the example given above, the cross-sectional area of each fin portion at its juncture with the base portion is about 0.0185 square inch, while the welded area between each pair of fin members is between 0.020 and 0.030 square inch depending on the extent of the scallops, the welded area being a little less than $9/_{64}$ inch in width and extending throughout the axial length of the hub or base portion. The area is cut down as compared to a weld with straight edges by the scalloped edge effect, but the perimetric length is increased. The length of the juncture between each fin portion and the base along the circumference of the tube is about 0.53 inch, the total for the four fins being about 2.14 inches. The length of the edges of each weld on the base, disregarding the ends of the welds where the welds are interrupted by the joints between successive base portions, is about the same as the circumferential length of each base portion, due to the increase in length of the edges as compared to the axial length of the bases because of the scallop effect, thus providing adequate paths for the flow of heat from the welded spots into the base. Obviously, by employing base portions of greater axial length, by using wider electrodes, or by other changes in proportions, the area and perimetric or edge length of the welds may be varied to give the required paths for efficient heat transfer. For example, where heavier gage fins are used, it may be desirable to obtain additional heat conductive capacity between tube and fins by providing additional rows of welds.

In the example given, the timing of the current and the speed of movement are such as to give about five welds per inch, whereas there are four fin members per inch. Thus the welding electrodes will at times roll over joints between adjacent base portions while the welding current is flowing. This presents no difficulty, for the bases are closely spaced and the path over the joints is quite smooth. However, if desired, the timing of the current may be correlated with the speed of movement and the number of fin members per unit of length so the current will be interrupted as the electrodes pass over the joints between adjacent base portions. This technique, while not essential, will somewhat reduce the wear on the electrodes.

Tubes of this character are particularly adapted for use in heat exchangers where the flow of fluid on the exterior of the tubes is transverse of the axis of the tubes. While the flow of fluid across tubes such as shown in Figures 1, 2 and 3 will ordinarily be sufficiently turbulent to meet the requirements of most installations, for some services it may be desirable further to increase the turbulence of flow of fluid on the exterior of the tubes. In Figure 4, two modified forms of fins are shown which will have this effect. In this figure, only one fin of each type is illustrated. However, in actual use, a series of fin members arranged as shown in Figures 2 and 3 would ordinarily be employed.

The fin member 27 shown in the left-hand portion of Figure 4 has a hub portion 28 similar to the hub portion 16 heretofore described and secured by welds 29 which may be similar to the welds 25 heretofore described. In this instance, however, there are 8 separate fin portions 30, and 8 spaces 31 between the fin portions providing 8 paths for the electrodes so that each base portion may be secured to the tube by 8 circumferentially spaced welded areas. Further, each fin portion is twisted slightly as shown in the drawing to increase the turbulence of flow of fluids thereacross.

The fin member 32 illustrated in the right-hand portion of Figure 4 of the drawing is in all material respects similar to the fin member 27 just described except that in this instance the alternate fin portions 33 and 34 are twisted in opposite directions. While I have illustrated these modifications as embodying eight fin portions in each member, those skilled in the art will appreciate that a greater or lesser number can be employed without departing from the teachings of my invention. In these modifications, the greater number of spaces between fin portions makes possible a greater number of welded areas and a corresponding increase in the cross-sectional area of the paths for the conduction of heat between the tube and the fins. As noted above, the number of welds employed with fins such as illustrated in Figures 1, 2 and 3 may also be increased over the four welds per member heretofore described.

In Figures 5, 6 and 7 I have illustrated a construction modified in two respects, either modification being useful without the other. Here the tube 35 has a plurality of circumferential fin members 36 thereon. These fin members comprise fin portions 37 and hub or base portions 38, the fin portions being separated by aligned spaces or slots 39 so that the welding operation can be carried out in longitudinal directions.

Here the base portions 38 are not continuous, but slots 40 are provided between the spaces 39. These preferably extend through the base portions and radially outwardly as far as practical, for example, about three-quarters of the way into the fin portions as shown. The slots have a dual function. First, they give the base or hub portions of the fin members a certain amount of resilience and flexibility which solid hub portions would not have, thus enabling the tolerances in the diameters of the tube and hub portions to be slightly greater while insuring proper fit and making the assembly of the fin members on the tube somewhat easier.

A second, and perhaps more important advantage of the slots is found in the fact that they increase the length of the paths for the flow of electricity through the fin members between the electrodes 41 and 42, thus increasing the resistance to the passage of current through the fin members themselves. This current, of course, is useless insofar as welding the base portions to the tube is concerned, and has the disadvantageous effect of merely heating the base portions without serving any useful purpose. With slots such as those illustrated, the length of the path that must be traversed by the current is substantially increased, thus the resistance is increased and the amount of current correspondingly decreased. Insofar as the welding operation is concerned, the slots give the advantage that would be obtained by the use of separate fin portions, yet the members are integral and held together so that they may be readily handled and retained in position on the tube prior to and during the welding operation.

In some instances, it is desirable to provide tubes with longitudinal as well as circumferential fins. The longitudinal fins not only increase the effective heat transfer surface of the tube, but also have the very important advantage of increasing the structural strength of the tubes. This is of great importance where tubes of considerable length are subjected to relatively high temperatures. Under such circumstances, plain tubes or tubes provided merely with circumferential fins may sag from their own weight and the weight of the fluid within them. Longitudinally extending fins greatly increase the strength of the tube and their ability to resist such deflection.

Tubes embodying my invention can readily be provided with such longitudinally extending fins. This is accomplished by the method diagrammatically shown in Figure 5 wherein a pair of channel section fin members 43 and 44 are disposed in the paths formed by an opposite pair of the aligned slots or spaces 39. The bases of these channel section members are then engaged by the electrodes 41 and 42, the assembly is progressed with respect to the electrodes and a welding current caused to flow simultaneously to weld the oppositely disposed channel members to the base portions by a series of welded areas, and to weld the base portions of the fin members to the tube. The welds are indicated diagrammatically at 45 and 46 in Figure 5, and as shown in Figure 6, extend throughout substantially the entire length of the channels. The welded areas are preferably proportioned with respect to the cross-sectional area of the flanges of the channel to give adequate paths for the flow of heat in the manner taught, for example, in my Patent No. 2,261,137, issued November 4, 1941. It will be noted that the hub or base portions 38 of the members 36 are shown in the drawing as being somewhat longer than the base portion 16 previously described. This results in greater spacing of the radial fins and larger welded areas for each fin member. The length of the hubs or base portions and, correspondingly, the spacing of the radial fin members, may be varied to suit different requirements.

Ordinarily only a single pair of oppositely disposed channel section fin members will be welded along such a tube, the welds along the remaining paths extending longitudinally of the tube being made merely between the base portions of the fin members and the tube as at 47 and 48 in Figures 5 and 7. A highly advantageous construction results when the edges of the flanges of the channels are bent inwardly into contact with each other as at 49 in Figure 7 and welded together, thus producing a closed-in fin of the type described in greater detail in my application aforesaid. The bending and welding operations may also be carried out as described in said application. This produces a structurally strong tube in which the longitudinally extending fins add to the strength of the tube, increase the effective heat transfer surface of the tube, and in addition, somewhat streamline the tube to reduce the resistance to flow of fluid across the tube in directions parallel to the longitudinally extending fins.

From the foregoing description of preferred forms of my invention, it will be seen that I have provided a heat exchanger element in which transversely extending fin members can be welded rapidly to the element by means of welding operations carried out in longitudinal directions. By this means the rapidity and economy of the welding operations are greatly increased as compared to methods wherein flanges are circumferentially welded to tubes, while the welded areas are such as to insure adequate paths for the flow of heat between the tubes and the fin members. The fin members themselves can be made rapidly and economically by stamping operations from relatively inexpensive materials. The shape and size and arrangement of several fin portions can be varied widely to suit different operating conditions, and if desired, the fin portions may be twisted, bent or otherwise formed to increase the turbulence of flow of fluid across the heated surface. If desired, longitudinal fins may be welded to the tube simultaneously with the welding operations for securing the circumferentially extending fins thereto, thus producing a structure having advantageous characteristics from the standpoint of strength, heat transfer ability and flow characteristics.

In the foregoing specification I have described various preferred forms of my invention. Further modifications and changes in my invention may be made without departing from the spirit and scope thereof. For example, the specification and drawings describe and illustrate the fins as applied to the exterior of round tubes, the fins may be applied to supporting surfaces of other shapes or configurations wherever the welding operations can be carried out in directions transverse to the surface of the fins. Other changes and modifications will doubtless occur to those skilled in the art. It is therefore to be understood that my patent is not limited to the preferred forms described herein or in any manner other than by the scope of the appended claims.

I claim:

1. A heat exchange element comprising a supporting surface and a series of transverse fin members united thereto, each transverse fin member comprising a base portion lying along the supporting surface and a plurality of fin portions formed integrally with said base portion and projecting away from said supporting surface, said fin portions being spaced apart by spaces extending to the base portion, each fin member having at least one such space, said fin members being arranged on said supporting surface with their spaces in substantial alignment to provide an unobstructed path therethrough, a longitudinal fin member disposed within said path and having a base portion joined to the base portions of the transverse fin members, the base portions of the transverse fin members being united to the supporting surface along said path.

2. A tube having a plurality of fin members secured thereto, each fin member comprising a base portion embracing the tube and a plurality of spaced transverse fin portions extending therefrom and lying generally transverse to the axis of the tube, the spaces between the transverse fin portions of the several fin members being substantially in alignment, a longitudinal member disposed along the path formed by said aligned spaces, the base portions of adjacent fin members being substantially in contact with each other, and said longitudinal member being secured to said base portions and said base portions being secured to the tube by welded areas extending along said path.

3. A tube having a plurality of fin members secured thereto, each fin member comprising a base portion embracing the tube and a plurality of spaced transverse fin portions extending therefrom and lying generally transverse to the axis of the tube, the spaces between the transverse fin portions of the several fin members being substantially in alignment, a longitudinal member having a base portion and two longitudinally extending flanges, said member being disposed along the path formed by said aligned spaces, the base portions of adjacent fin members being substantially in contact with each other, and said longitudinal member being secured to said base portions and said base portions being secured to the tube by welded areas extending along said path.

4. A tube having a plurality of fin members secured thereto, each fin member comprising a base portion embracing the tube and a plurality of spaced fin portions extending therefrom and lying in planes generally transverse to the axis of the tube, the spaces between the fin portions of the several fin members being substantially in alignment, a closed, hollow longitudinal member extending along the path formed by said aligned spaces, the base portions of adjacent fin members being substantially in contact with each other, and said longitudinal member being secured to said base portions and said base portions being secured to the tube by welded areas extending along said path.

5. A heat exchange element comprising a metallic tube; a plurality of transversely disposed metallic fin members projecting radially from the surface of said tube and formed with one or more alined radially extending slots; and one or more longitudinal fins extending axially of the tubes and disposed each in one of said slots.

JOHN W. BROWN, Jr.

REFERENCES CITED

The following references are of record in the file of this patent:

UNITED STATES PATENTS

| Number | Name | Date |
|---|---|---|
| 2,261,136 | Brown, Jr. | Nov. 4, 1941 |
| 2,261,137 | Brown, Jr. | Nov. 4, 1941 |
| 2,220,579 | Murray | Nov. 5, 1940 |
| 2,298,250 | Brown, Jr. | Oct. 6, 1942 |
| 2,216,778 | Houdry | Oct. 8, 1940 |
| 2,067,678 | Nesselmann | Jan. 12, 1937 |
| 1,870,669 | Brown | Aug. 9, 1932 |
| 2,089,340 | Cobb | Aug. 10, 1937 |
| 2,298,249 | Brown | Oct. 6, 1942 |
| 1,967,728 | Taylor | July 24, 1934 |
| 2,219,352 | Andrus | Oct. 29, 1940 |
| 2,355,621 | Brown | Aug. 15, 1944 |

FOREIGN PATENTS

| Number | Country | Date |
|---|---|---|
| 340,765 | British | Jan. 8, 1931 |
| 492,108 | British | Sept. 15, 1938 |

OTHER REFERENCES

The Welding Journal, Feb. 1940, page 96. (Copy in Div. 60.)